United States Patent [19]

Oulevay et al.

[11] 3,967,889

[45] July 6, 1976

[54] DRIVE AND STOPPING METHOD AND DEVICE FOR A CINEMATOGRAPHIC CAMERA

[75] Inventors: Serge Oulevay, Yverdon; Marc Niederhauser, Boudry, both of Switzerland

[73] Assignee: Bolex International SA, Ste-Croix, Switzerland

[22] Filed: Sept. 7, 1973

[21] Appl. No.: 395,048

[30] Foreign Application Priority Data

Sept. 8, 1972 Switzerland...................... 013591/72

[52] U.S. Cl. ............................................... 352/174
[51] Int. Cl.² .......................................... G03B 1/00
[58] Field of Search.................... 352/174, 176, 177

[56] References Cited
UNITED STATES PATENTS

| | | | |
|---|---|---|---|
| 3,512,881 | 5/1970 | Kubota ................................. | 352/176 |
| 3,565,521 | 2/1971 | Butler .................................. | 352/163 |
| 3,690,752 | 9/1972 | Derossi ............................... | 352/174 |
| 3,692,394 | 9/1972 | Bauer................................... | 352/176 |
| 3,809,466 | 5/1974 | Kobayashi........................... | 352/177 |
| 3,810,692 | 5/1974 | Drasch................................ | 352/174 |
| 3,819,258 | 6/1974 | Butler.................................. | 352/176 |

*Primary Examiner*—Monroe H. Hayes

[57] ABSTRACT

A cinematographic apparatus having an electric motor coupled to a drive shutter, first means coupled to the shutter for sensing a predetermined position thereof, second means coupled to the motor for locking said motor and the shutter in a predetermined position, and a control circuit for providing driving power to the motor, and third means for removing forward driving power, and control means including a trigger switch for unlocking said second means before actuating the control circuit to provide forward driving power to the motor; said control circuit is adapted to continue to supply forward driving power to the motor after release of the trigger switch, said third means removing forward driving power in response to release of said trigger switch and detection by said first means of said predetermined motor position, and said control means adapted to control said second means to lock said drive motor in a predetermined position after removal of the driving power by said third means.

5 Claims, 3 Drawing Figures

DRIVE AND STOPPING METHOD AND DEVICE FOR A CINEMATOGRAPHIC CAMERA

FIELD OF INVENTION

The present invention relates to a cinematographic camera with drive motor control that assures a rapid shutter stop in the closed position and more particularly to such camera with an electric drive motor with means to stop and lock the motor in a predetermined angular position.

BACKGROUND OF INVENTION

In drive apparatus of certain cinematographic equipment such as cameras and the like, it is sometimes necessary that the stop position be reliably fixed and remain constant. Such a requirement is essential in cameras taking cinematographic pictures in which the shutter must necessarily be closed when the camera is stopped after filming a sequence.

Apparatus is known in which the stop position of the drive mechanism is controlled by mechanical means. One common example is a ratchet and pin assembly which stops the drive motor shaft at the moment of stopping the film. Such known apparatus are relatively expensive and can deteriorate, either due to wear, or by reason of incorrect usage.

SUMMARY OF INVENTION

The present invention provides a new and improved drive and stopping method and device for a cinematographic camera comprising an electric motor capable of being stopped in a predetermined and a fixed angular position. A feature of the invention is that it comprises means to brake the motor and lock the motor on stopping at the correct or fixed angular position.

DETAILED DESCRIPTION

The invention will now be described in more detail, by way of example only, with reference to the accompanying diagrammatic drawings in which.

Figure 1:
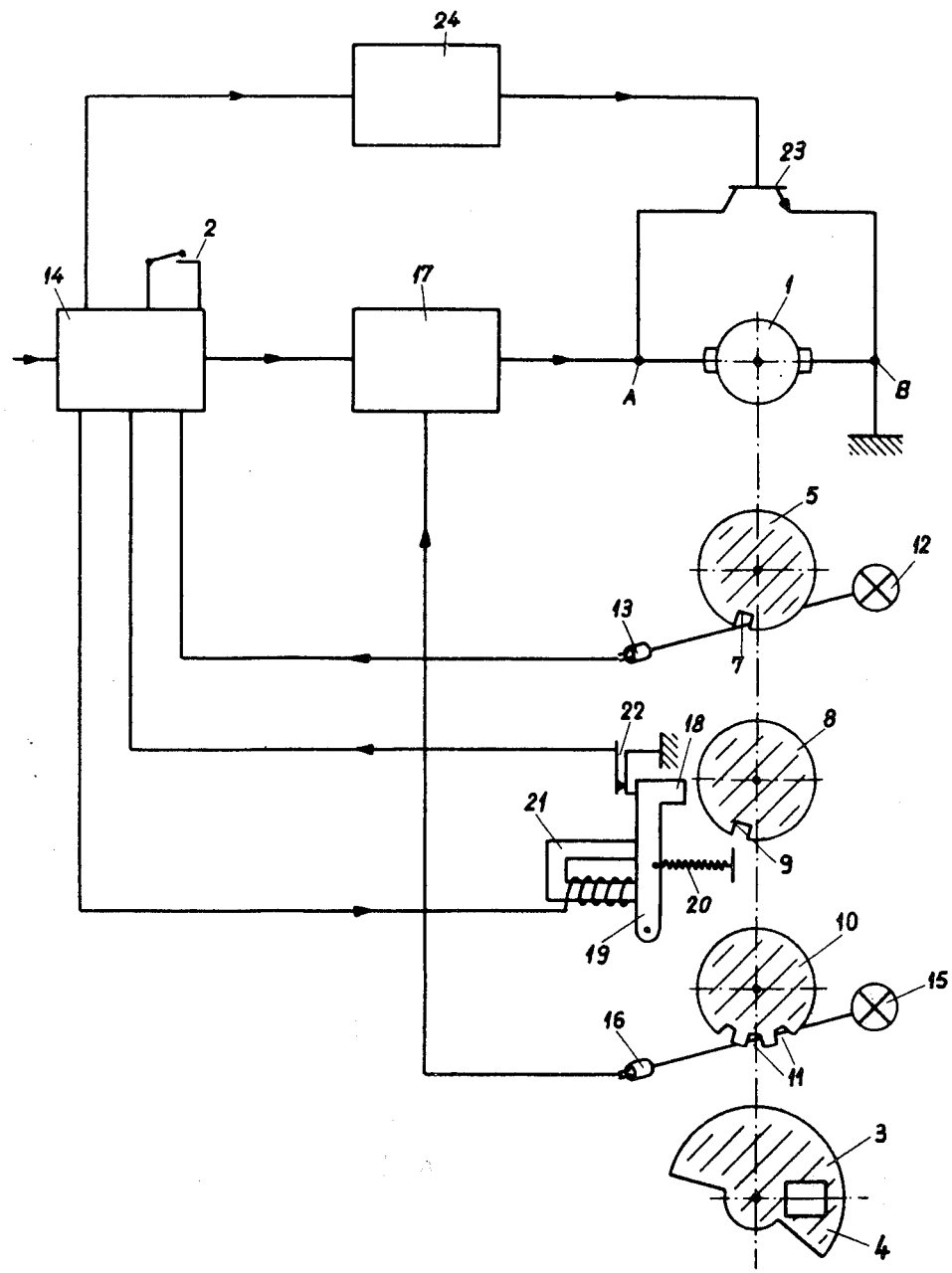
FIG. 1 is a diagram showing a first embodiment of the invention.

Referring to FIG. 1, a cinematographic drive motor 1 having a permanent magnet is supplied during picture taking, when the trigger contact 2 fixed on the handle (not shown), of the camera is engaged. The motor shaft drives a rotatable shutter 3 which intermittently masks a picture taking window 4, a first disc 5 provided with a notch 7, a second disc 8 provided with a notch 9 and a third disc 10 provided with a series of notches 11 arranged regularly along the circumference of disc 10.

A position detector formed by an incandescent lamp 12, and a phototransistor 13 is connected to the input of a control circuit 14. Disc 5 provided with notch 7 either interrupts or permits light from lamp 12 to energize photo-transistor 13 depending upon the angular position of disc 5.

A tachometer formed by an incandescent light source 15, a phototransistor 16 and the disc 10 provided with a series of notches 11, arranged regularly on the circumference of the disc 10 is connected to one of the inputs of a control circuit 17 to indicate the speed of the motor 1.

The notch 9 of the disc 8 cooperates with a lug 18 of a lever 19 for locking the motor in the stop position. The lever 19 is subjected on the one hand to the action of the spring 20 which tends to engage the lug 18 and the notch 9 and on the other hand to that of an electromagnet 21 connected to a control circuit 14. The contact 22 connected mechanically to the lever 19 is connected electrically to the control circuit 14.

The terminals A and B of the motor 1 are connected through the intermediary of the transistor 23 of which the base is connected to the output of the braking circuit 24. The input of the braking circuit 24 is connected to the control circuit 14.

Figure 3:
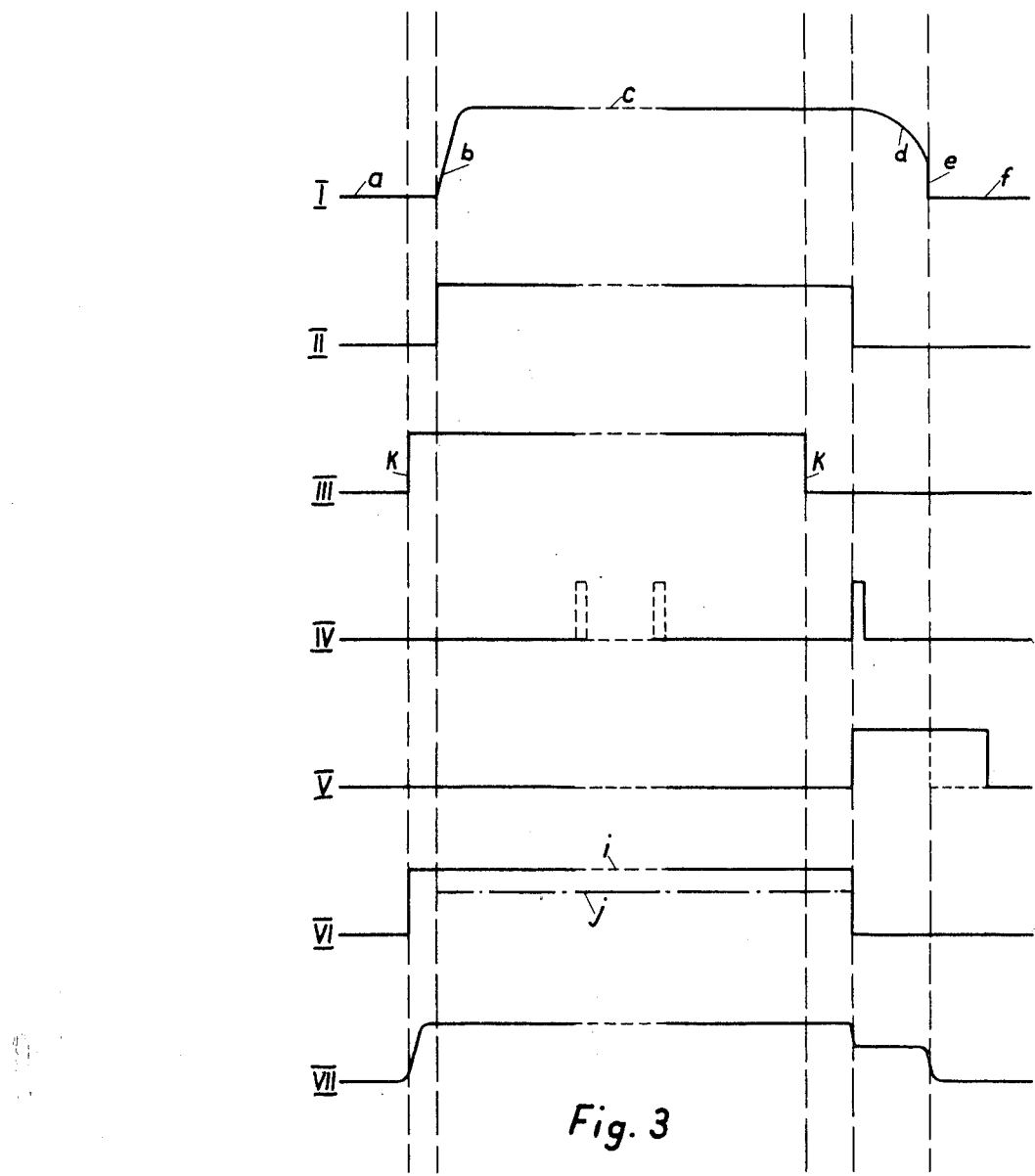
FIG. 3 is a diagram showing graphically the operation of the device in accordance with the invention.

With reference to FIG. 3, I represents the speed curve of the motor; II represent the supply of the motor; III shows the position of the release button 2; IV represents the signal emitted by the position detector 5 and 5—; V represents the curve of the braking cycle; VI shows the supply of the electomagnet 21 and VII shows the course of the locking lever 19 of the motor in its stopping position.

According to the embodiment in FIG. 1, the braking cycle of the motor is carried out by a short circuit across the terminal A and B upon activating transistor 23. The curve of the speed if the motor is divided up into several parts. $a$ and $f$ correspond to the rest period respectively before and after the taking of the sequence of pictures; $b$ corresponds to the period in which the motor 1 passes through zero and its normal operating speed; the zone $c$ shows the taking of picture frames corresponding to the sequence, the motor rotating regularly at its normal speed; $d$ corresponds to a reduction in speed due to a braking by short circuiting of the terminals of the motor; $e$ corresponds to the locking which can be produced when the speed has been sufficiently reduced.

In operation, when the camera is in the rest state, motor 1 is locked in its stop position with lug 18 of the lever 19 pulled by action of the spring 20 into engagement with notch 9 of disc 8. The electromagnet is not at this time supplied with current. When the trigger 2 is depressed (closed), fixed for example on the handle of the camera (FIG. 3, curve III) the lever 19 is attracted by the electromagnet for which the force attraction is greater than that of spring 20. It should be noted that during the time that the motor is not supplied with current, it remains in its rest state. It is only after the removal of the lug 18 from the notch 9 that the motor begins to be supplied, that is as soon as the contact 22 fixed to the lever 19 is closed (FIG. 3, curve II).

From the closing of switch 22 it is desirable to reduce the supply of current to the electromagnet to avoid excess drain on the batteries (not shown). In FIG. 3, $i$ shows the current necessary to attract lever 19 and $j$ shows the current necessary to hold lever 19 in its position shown in FIG. 1. During the entire picture taking sequence, that is, during the time corresponding to the part $c$ of the speed curve I, the control circuit 14 receives pulses from the position detector 5, but does not acts on them when the contact 2 is engaged. These pulses are shown on the curve IV of FIG. 3. During the same period corresponding to the normal functioning of the camera, the control circuit 17 receives the pulses transmitted by the tachometer 10 and adjusts the speed of the motor to a closely controlled constant value.

The base of transistor 23 is connected to the output of the braking circuit 24 with transistor 23 normally in the nonconductive state. The motor 1 has one of its terminals connected to earth and is supplied at A by the current from control circuit 17.

After the picture taking sequence the trigger is released and contact 2 opened, which corresponds to the segment k of the curve III (FIG. 3). The supply current for the motor is maintained until the position detector 5 transmits the next pulse to control circuit 14. At this moment, the supply current to electromagnet 21 is cut. The arm 19 rotates under the action of the spring 20 and the lug 18 abuts the circular region of the disc 8 (FIG. 3, curves VI and VII). At the same moment, the supply current to the motor is cut (FIG. 3, curve II) because the contact 22 fixed to the lever 19 is opened. The transistor 23, the base of which becomes biased by the braking circuit 24, becomes conductive and short circuits the terminals A and B of the motor 1, for which the speed rapidly decreases. The triggering of the braking circuit and the fall of speed of the motor are shown respectively by the curves V and I (d) of FIG. 3.

When the speed of the motor has reached a value sufficiently small for the locking mechanism to operate without damage, the lug 19 engages in the notch 19 and stops the motor in the predetermined stopping position.

Figure 2:
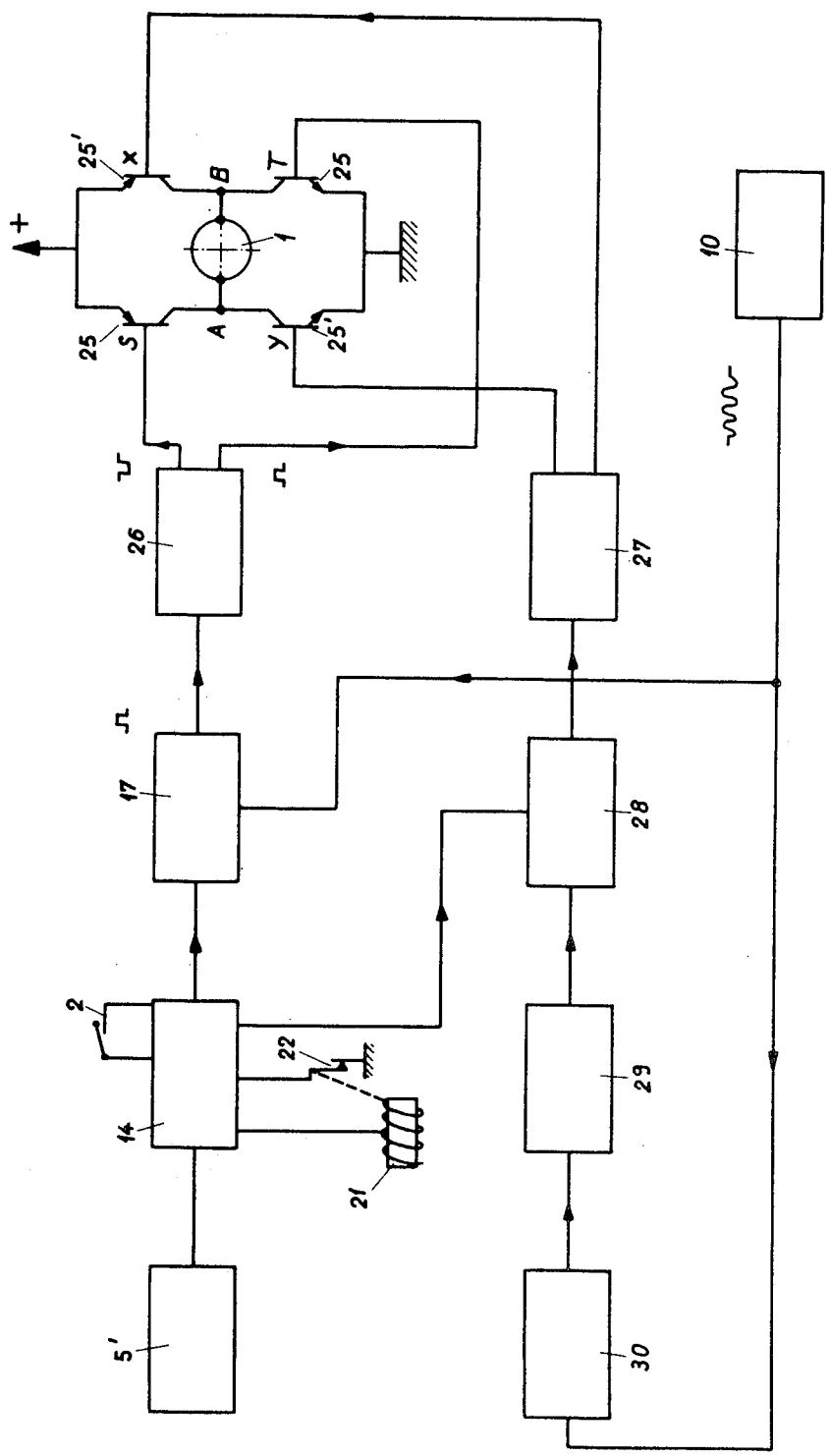
FIG. 2 is the diagram showing a second embodiment of the invention.

Referring to FIG. 2, 1 represents the drive motor of the camera, of which the terminals A and B are connected to the collectors of four transistors 25 and 25— in bridge formation. The bases S and T of transistors 25 are connected to the output first signal invertor 26 while the bases X and Y of transistors 25— are connected to the output of a signal invertor 27. As in the case of the embodiment of FIG. 1, the control circuit 14 is connected to the trigger contact 2; at the position detector 5— which can be formed as described above, by the disc provided with a peripheral notch and which, driven by the motor cooperates with a light source and photo transistor; to the electromagnet 21 which controls the locking of the motor in its stopping position; to the contact 22 mechanically connected to the lever (not shown), to the circuit controlling the locking 28; and to the circuit controlling the speed 17. The latter is connected to the control tachometer 10— which can, as described in reference FIG. 1, be formed by a disc provided with a series of notches regularly arranged along its periphery and which cooperates with an incandescent light source and a phototransistor to emit control pulses. The control tachometer is also connected to the input of an amplifier 30 connected to a pulse shaping circuit for the pulses transmitted by the tachometer 10— and amplified by the amplifier 30. The signal from the output of the pulse shaping circuit 29 is transmitted through the intermediary of the locking circuit 28 by the second inverter 27 to the bases X and Y of transistors 25—.

The embodiment of FIG. 2 operates as follows. The braking cycle of the motor is carried out by a counter-current sent across the terminals A and B and tending to make it turn in the opposite sense.

Only the operation of the parts fundamentally different from those which form the device of FIG. 1 will be described in detail.

During normal picture taking operating conditions, the tachometer supplies a signal transmitted to the known speed control circuit 17, for which the output signal supplies a signal inverter 26. The two outputs of the signal inverter are connected to the bases S and T of transistors 25 of which the collectors are connected to terminals A and B of the motor. Under normal operation, the transistors 25 are in the conductive state and the motor is supplied by the diagonal branch S-T of the bridge.

When the braking is started, the signal from the tachometer 10 is sent to an amplifier 30 and then a pulse shaping circuit which supplies at its output rectangular pulses. The signal is inverted by inverter 27 for which the terminals of the output are connected to bases X and Y of transistors 25′ for which the collectors are connected to terminals A and B of the motor. The transistors 25 are in the non-conductive state and the motor is supplied by the diagonal branch X-Y of the bridge. The locking circuit 28 avoids the motor being supplied simultaneously by the two circuits.

In order to provide a more efficient and rapid braking, it is desirable to provide the motor with a continuous supply. It would therefore be necessary to integrate the signal from the tachometer 10. The disadvantage of such an integration is that the supply of the motor is zero at the moment when the tachometer transmits the zero signal, which causes a starting of the motor in the opposite direction.

To overcome this disadvantage, the motor is supplied by rectangular pulses, so that the interval between two successive pulses is very short in relation to the length of a pulse.

It will be understood that other and further modifications can be made to the exemplary embodiments of the invention disclosed herein without departing from the spirit and scope of the present invention.

What is claimed is:

1. In a cinematographic apparatus, means defining an optical path;
   a shutter arranged to intercept said optical path and having an open position and a closed position;
   an electric motor drivingly coupled with said shutter to control its position;
   a power supply circuit to energize said motor;
   position detecting means coupled to said shutter for common rotation to supply a signal every time a predetermined position is reached by said shutter in a timed relation to said closed position of said shutter;
   release means moveable into operative and inoperative positions for controlling the drive of said shutter;
   mechanical locking means to stop said shutter mechanically in its closed position, said locking means including abutting means moveable into an unlocking position and moveable towards a locking position, and counter-abutting means coupled to said shutter for common movement and for abutting in a locking relationship against said abutting means to lock said shutter in said closed position;
   electric brake means to stop the motor within a predetermined distance; and
   control means responsive to said operative position of said release means for maintaining said abutting means in said unlocking position and responsive to said inoperative position of said release means and said signal of said position detecting means for causing said abutting means to move towards said locking position and initiating braking by said electric brake means before said abutting means and said counter-abutting means abut in said locking relationship.

2. The apparatus as set forth in claim 1, wherein said release means comprise trigger switch means connected through said power supply circuit;

said control means includes a by-pass circuit arranged to by-pass said trigger switch means and to switch said electric brake means on and off;

by-pass switch means arranged within said by-pass circuit to by-pass said trigger switch means and being controlled by said abutting means, whereby, when said abutting means is in unlocking position, the by-pass switch means assumes a by-passing condition, and, with the abutting means outside the unlocking position, the by-pass switch means interrupts the by-pass circuit;

said electric brake means being switched off with said by-pass switch means in by-passing condition and being switched on with the by-pass circuit interrupted.

3. The apparatus as set forth in claim 1, further comprising tachometer means for determining the shutter speed and for de-energizing said electric brake means when said shutter speed falls below a predetermined speed to de-energize said electric brake means.

4. The apparatus as set forth in claim 3 wherein said electric brake means when energized provide reverse drive power to said electric motor.

5. An apparatus as set forth in claim 1, comprising a bridge of four transistors, two of which electrically coupled between said power supply circuit and the motor terminals to provide forward driving power and the other two of which electrically coupled between said power supply circuit and the motor terminals to provide reverse driving power for braking the motor.

* * * * *